United States Patent
Oh

(10) Patent No.: US 11,654,854 B2
(45) Date of Patent: May 23, 2023

(54) SIDE MOUNTING SEAT OF PAB CHUTE WITH IMPROVED WELDABILITY AND METHOD OF MANUFACTURING PAB CHUTE

(71) Applicant: HYUNDAI MOBIS Co., Ltd., Seoul (KR)

(72) Inventor: Young Ki Oh, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 67 days.

(21) Appl. No.: 17/361,663

(22) Filed: Jun. 29, 2021

(65) Prior Publication Data
US 2022/0250572 A1    Aug. 11, 2022

(30) Foreign Application Priority Data

Feb. 9, 2021    (KR) .................... 10-2021-0018700

(51) Int. Cl.
  *B60R 21/217*    (2011.01)
  *B60R 21/21*     (2011.01)
  *B60R 21/2165*   (2011.01)

(52) U.S. Cl.
  CPC .......... *B60R 21/21* (2013.01); *B60R 21/2165* (2013.01); *B60R 2021/2172* (2013.01)

(58) Field of Classification Search
  CPC ........................................... B60R 2021/2172
  See application file for complete search history.

(56) References Cited

U.S. PATENT DOCUMENTS

| | | | |
|---|---|---|---|
| 6,152,480 A * | 11/2000 | Iwanaga | B29C 44/1228 |
| | | | 280/232 |
| 6,533,312 B1 * | 3/2003 | Labrie | B60R 21/216 |
| | | | 280/732 |
| 6,623,029 B2 | 9/2003 | Sun et al. | |
| 10,220,807 B2 | 3/2019 | Mazzocchi et al. | |
| 10,363,897 B2 * | 7/2019 | Citko | B60R 21/2171 |
| 2019/0100164 A1 * | 4/2019 | Citko | B60R 21/2171 |

(Continued)

FOREIGN PATENT DOCUMENTS

| | | | | |
|---|---|---|---|---|
| CN | 114347941 A * | 4/2022 | | B60R 21/04 |
| DE | 102008047676 B4 * | 2/2019 | | B29C 65/1635 |
| EP | 0739788 A1 * | 10/1996 | | |

(Continued)

OTHER PUBLICATIONS

Notice of Allowance issued in corresponding Korean Patent application 20210018700A dated Mar. 9, 2023.

*Primary Examiner* — Nicole T Verley
(74) *Attorney, Agent, or Firm* — Morgan, Lewis & Bockius LLP

(57) ABSTRACT

The present disclosure relates to a side mounting seat with an increased area that a vibration welding pressing jig directly presses. It is important to minimize an unpressed area by maximally securing an area that a welding jig may directly press in order to simultaneously secure weldability and exterior quality. The present disclosure provides a structure in which a hollow space in a side mounting seat is reduced by minimizing a necessary area of a hollow doghouse of the side mounting seat of each of both sides of a PAB chute, and a pressing target surface is added to allow the welding jig to press an idle region which is conventionally not directly pressed by the welding jig.

18 Claims, 12 Drawing Sheets

(56) References Cited

U.S. PATENT DOCUMENTS

2022/0111816 A1\*   4/2022   Lee ..................... B60R 21/205
2022/0234536 A1\*   7/2022   Oh ..................... B60R 21/2165

FOREIGN PATENT DOCUMENTS

| | | | | |
|---|---|---|---|---|
| EP | 0988183 | B1 \* | 2/2005 | |
| JP | 2004338092 | A \* | 12/2004 | ......... B29C 65/0618 |
| JP | 2009-192085 | A | 8/2009 | |
| KR | 10-0405813 | B1 | 11/2003 | |
| KR | 2008-0027425 | A | 3/2008 | |
| KR | 2010-0031948 | A | 3/2010 | |
| KR | 10-1062587 | B1 | 9/2011 | |
| KR | 10-2013-0128053 | A | 11/2013 | |
| KR | 2014-0006477 | A | 1/2014 | |
| KR | 20170124034 | A \* | 11/2017 | |
| KR | 20220048324 | A \* | 4/2022 | |
| KR | 20220108260 | A \* | 8/2022 | |
| KR | 20220121286 | A \* | 9/2022 | |
| WO | WO-0179040 | A1 \* | 10/2001 | ........... B60R 21/216 |

\* cited by examiner

SIDE MOUNTING SEAT OF PAB CHUTE WITH IMPROVED WELDABILITY AND METHOD OF MANUFACTURING PAB CHUTE

CROSS-REFERENCE TO RELATED APPLICATION

This application claims priority to and the benefit of Korean Patent Application No. 10-2021-0018700 filed on Feb. 9, 2021, the disclosure of which is incorporated herein by reference in its entirety.

BACKGROUND

1. Field of the Invention

The present disclosure relates to a passenger airbag (PAB), and more specifically, to a structure of a side mounting seat allowing vibration weldability of a PAB chute to be improved and a method of manufacturing a PAB chute having the side mounting seat.

2. Discussion of Related Art

There are various methods of assembling a passenger airbag (PAB) chute (or in another word, PAB door), and among the methods, a method of coupling a PAB chute 13 to a rear side of a crash pad panel 11 forming an exterior of the PAB chute through a vibration welding is widely used as shown in FIG. 1.

The PAB chute 13 is made from thermoplastic olefin (TPO) material in consideration of airbag deployment performance, and the crash pad panel 11 is made from polypropylene fiber (PPF) based material. Although both are made from the materials in the same material family as above, since the materials are not 100% the same, the weldability between the PAB chute 13 and the crash pad panel 11 may be very sensitive when a vibration welding process is performed and an airbag deploys.

As illustrated in FIG. 2, a PAB module 19 is mounted on the PAB chute 13 by a coupling bolt 27 thereto. To this end, as illustrated in FIG. 1, a hardware part (e.g., a push nut) which is a counterpart of the bolt for coupling should be fitted to both side portions of the PAB chute 13, and thus a side mounting seat 17 on which the hardware part 21 is seated should be formed.

FIG. 3 is an enlarged view illustrating the side mounting seat 17. It may be seen that the hardware part 21 which is the counterpart of the bolt is inserted into the side mounting seat 17. The side mounting seat 17 is formed in a hollow form referred to as a doghouse 23 made by using a slide core of a mold when the PAB chute 13 is manufactured through an injection molding process. The doghouse 23 has an opening facing outward from each of both sides of the PAB chute 13; and a closed wall disposed at a side opposite to a side of the opening, that is, at a central portion of the PAB chute 13.

In order to perform vibration welding on two products (that is, the crash pad panel 11 and the PAB chute 13), a vibration welding jig should directly press a contact portion of the products and repeatedly rub the products at a high speed (in FIG. 3, a pressing direction of the vibration welding is denoted by arrows 25). However, when the side mounting seat 17 including the doghouse 23 which is topologically hollow is directly pressed, since the hollow side mounting seat 17 is damaged and broken, a pressed part corresponding to the side mounting seat 17 is not provided in the vibration welding pressing jig. Accordingly, weldability, adhesive force, welding quality, etc., of a region of the side mounting seat 17 is relatively degraded unlike the other region.

Accordingly, due to a difference in weldability, a portion, which should be torn along a scoring line 15 (see FIG. 1) of the panel 11, is partially separated due to a crack of an undesired portion so that a 'clam shell' (chip) is generated when a PAB deploys.

SUMMARY OF THE INVENTION

As described above, conventionally, only an outside of a doghouse is pressed and an inside thereof is not pressed when in vibration welding. Accordingly, due to a lack of weldability at a portion of the doghouse, there arises a problem in that a passenger airbag (PAB) deploys out of a desired scoring line so that a clam shell (chip) is generated when the airbag deploys The present disclosure is directed to providing a structure of a side mounting seat allowing a direct pressing target area of a vibration welding pressing jig to be increased and a method of manufacturing a PAB chute including the side mounting seat.

To solve such problems, it is important to minimize an unpressed area by maximally securing an area that a welding jig may directly press in order to simultaneously secure weldability and exterior quality. The present disclosure provides a structure in which a hollow space in a side mounting seat is reduced by minimizing a necessary area of a hollow doghouse of the side mounting seat of each of both sides of a PAB chute, and a pressing target surface is added to allow the welding jig to press an idle region which was conventionally not directly pressed by the welding jig. In addition, an auxiliary structure is added so as not to interfere with airbag cushion deployment.

Specifically, according to one aspect of the present disclosure, a side mounting seat includes a doghouse having a hollow space between a lower portion of a side mounting seat and a base surface of the PAB chute and including an opening at one side thereof, and a direct pressing target surface extending at a substantially right angle on a closed wall disposed at an opposite side of the opening of the doghouse, and located at a position higher than the base surface of the PAB chute, such that the direct pressing target surface is directly pressed by a vibration pressing welding jig when the PAB chute is vibration-welded to the crash pad panel.

In addition, the side mounting seat may further include at least one guide protrusion disposed on an upper surface, on which the bracket is seated, of the side mounting seat, wherein one portion of the guide protrusion may be disposed on the upper surface, on which the bracket is seated, of the side mounting seat, and a sidewall having an angle of inclination with respect to the base surface of the PAB chute. The angle between the sidewall of the side mounting seat and a line perpendicular to the base surface of the PAB chute may be 0.5°.

According to another aspect of the present disclosure, a method of manufacturing a PAB chute including forming a doghouse between a lower portion of a side mounting seat and a base surface of the PAB chute the doghouse including an opening at one side thereof, and forming a direct pressing target surface extending at a substantially right angle on a closed wall disposed at an opposite side of the opening of the doghouse, wherein the direct pressing target surface is located at a position higher than the base surface of the PAB chute, such that the direct pressing target surface is directly pressed by a vibration pressing welding jig when the PAB chute is vibration-welded to the crash pad panel.

A structure and operation of the present will be clearer through specific embodiments described below with reference to the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present disclosure and methods of achieving the same will be clearly understood with reference to the accompanying drawings and the following detailed embodiments. However, the present disclosure is not limited to the embodiments to be disclosed but may be implemented in various different forms. The embodiments are provided in order to fully explain the present disclosure and fully explain the scope of the present disclosure for those skilled in the art. The scope of the present disclosure is defined by the appended claims. Meanwhile, the terms used herein are provided only to describe the embodiments of the present disclosure and not for purposes of limitation. In the present specification, unless the context clearly indicates otherwise, the singular forms include the plural forms. It will be understood that the term "comprise" or "comprising," when used herein, specifies some stated components, steps, operations, and/or elements but do not preclude the presence or addition of one or more other components, steps, operations, and/or elements.

Hereinafter, embodiments of the present disclosure will be described with reference to the accompanying drawings. In the descriptions of the embodiments of the present disclosure, when specific descriptions of related well-known technologies or functions are deemed to unnecessarily obscure the understanding of the embodiments of the present disclosure, they will be omitted.

FIGS. 4 to 8 are views illustrating a coupling portion of a conventional passenger airbag (PAB) chute 13 and a conventional PAB module 19 before the present disclosure is applied thereto.

Figure 1:
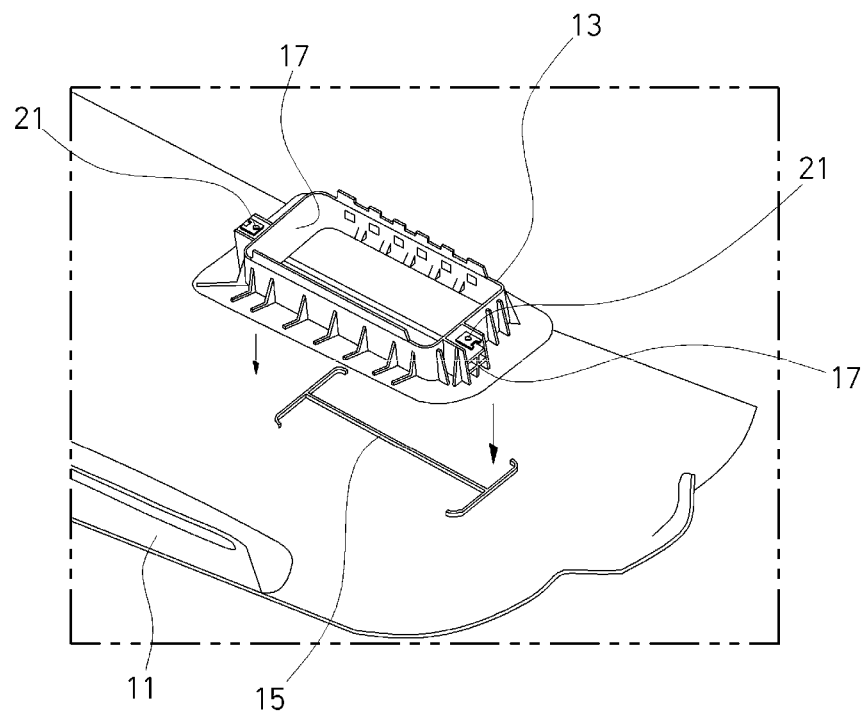
FIG. 1 is an explanatory view illustrating a coupling structure of a passenger airbag (PAB) chute (13) and a crash pad panel (11)
Figure 2:
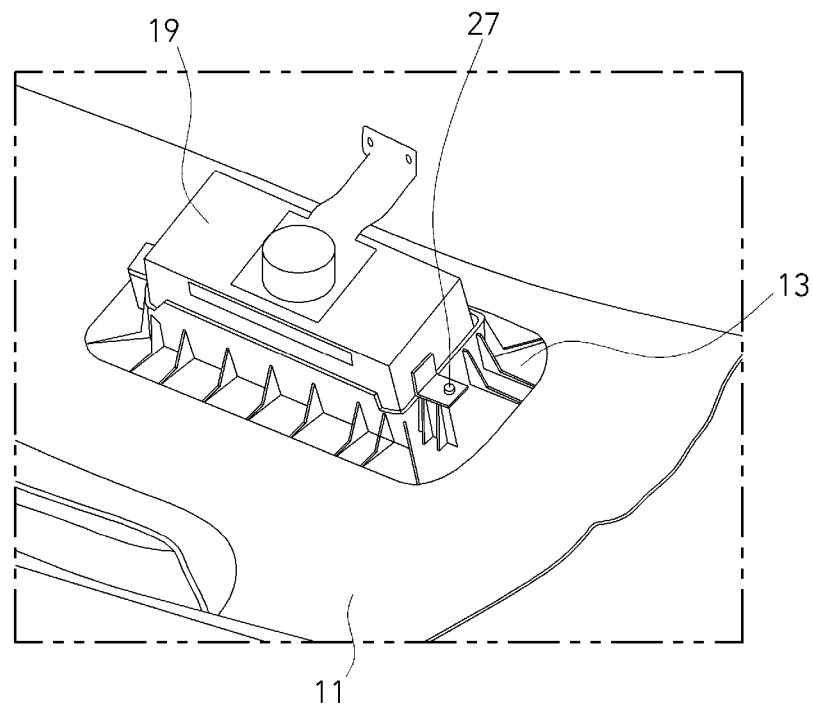
FIG. 2 is an explanatory view illustrating a coupling structure of the PAB chute (13) and a PAB module (19)
Figure 3:
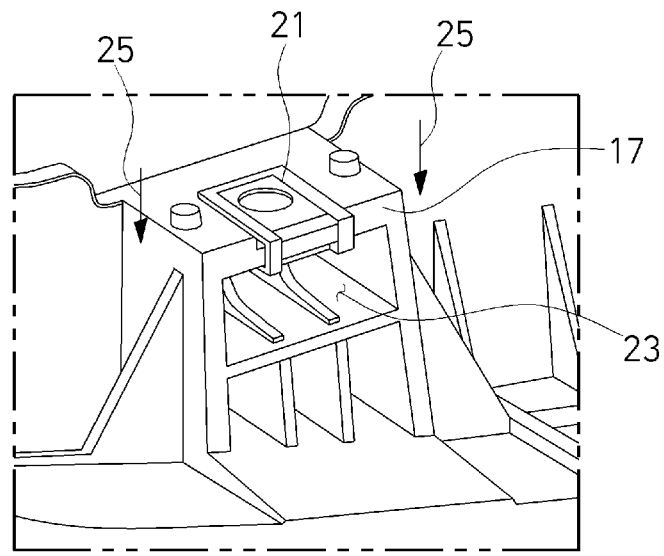
FIG. 3 is an enlarged view illustrating a side mounting seat (17)
Figure 4:
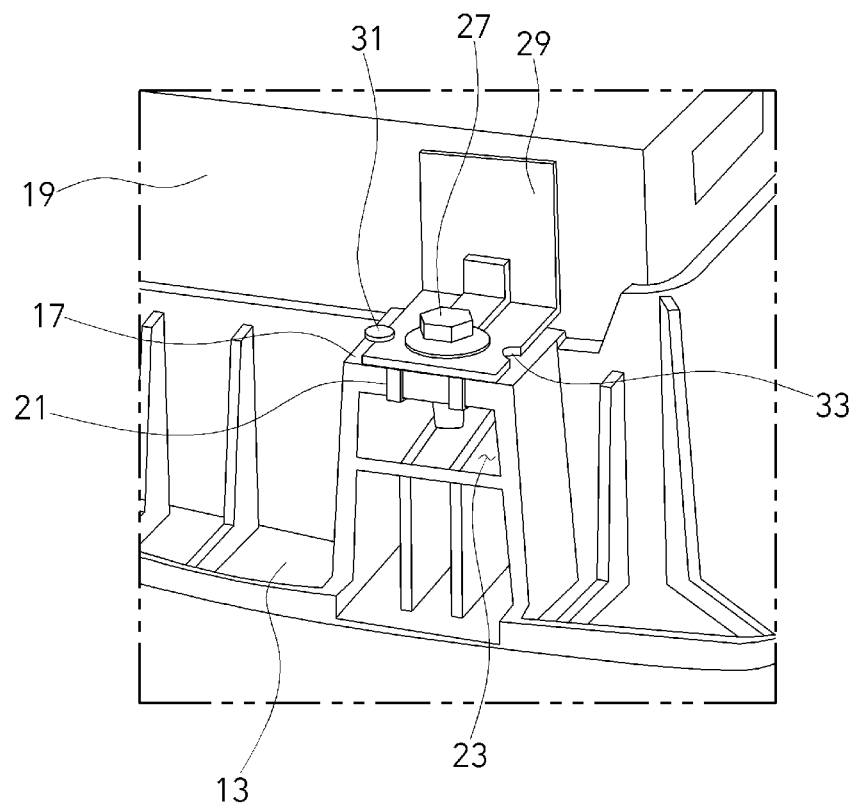
FIG. 4 is a detail view illustrating a coupling portion of the conventional PAB chute (13) and the conventional PAB module (19)

With reference to FIG. 4, a push nut 21, which is a counter hardware part of a bolt, is inserted into a side mounting seat 17 of each of both sides of the PAB chute 13 in a lateral direction, and a bracket 29 which is substantially L-shaped is attached to each of both side surfaces of the PAB module 19 to allow a bolt 27 to pass through the bracket 29 and be mounted on the side mounting seat 17. The bracket 29 of the PAB module 19 is disposed on the side mounting seat 17 of the PAB chute 13 formed as described above, and the bolt 27 is coupled to the push nut 21 so that the PAB chute 13 is coupled to the PAB module 19.

For easy positioning when the PAB chute 13 and the PAB module 19 are coupled, at least one guide protrusion 31 is formed on a surface, which is not occupied by the push nut 21, of edge portions of both sides of the side mounting seat 17 in a width direction, and a groove 33 being coupled to the guide protrusion 31 is formed in the bracket 29 of the PAB module 19 at a corresponding position. When the PAB chute 13 is coupled to the PAB module 19, the positioning is easily performed by aligning the guide protrusion 31 with the groove 33 so that assembly can be easily performed.

In FIG. 4, it may be seen that a doghouse 23 having an empty space, which is described above, is formed below the side mounting seat 17. As an example, a width of the bracket 29 of the PAB module 19 may be about 30 mm.

Figure 5:
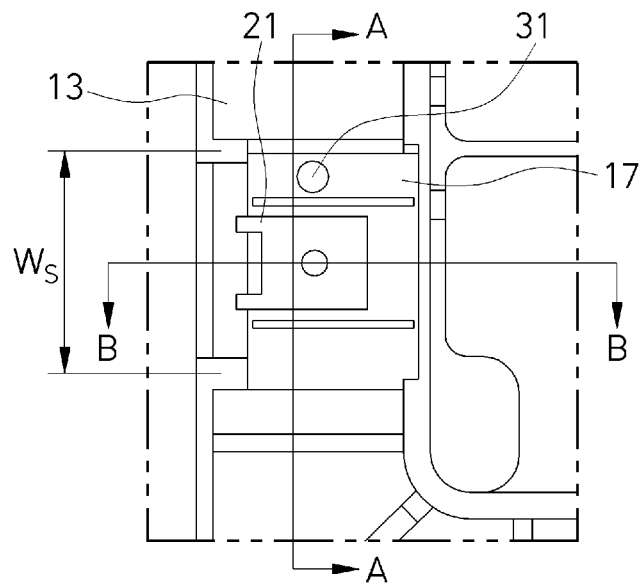
FIG. 5 is a plan view illustrating the side mounting seat (17)

FIG. 5 is a plan view illustrating the side mounting seat 17 on which the push nut 21 is mounted. As described above, the guide protrusion 31 is formed on the surface of the side mounting seat 17, and an entirety, 100%, of the guide protrusion 31 is formed on the side mounting seat 17. This means that the entirety of the guide protrusion 31 is disposed within an entire width Ws of the side mounting seat 17. In this case, the entire width Ws is about 38 mm (See FIG. 6).

Figure 6:
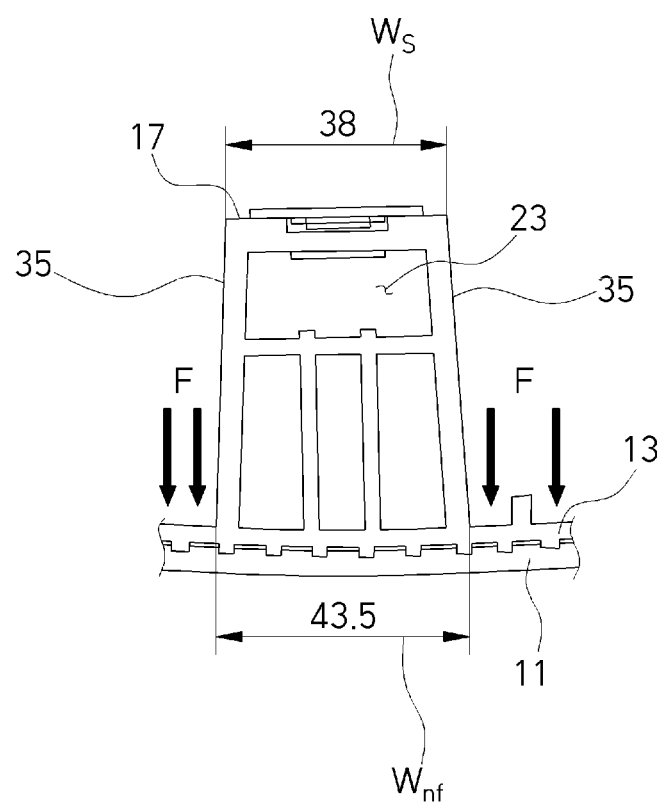
FIG. 6 is a cross-sectional view taken along line A-A of FIG. 5.

FIG. 6 is a cross-sectional view taken along line A-A of FIG. 5 and shows a cross section of a state in which the PAB chute 13 is vibration-welded to a crash pad panel 11. Since a direct pressing force F of a vibration pressing welding jig is directly applied only to a periphery of the side mounting seat 17 excluding the doghouse 23, the pressing force F is not applied to a width Wnf occupied by an inclined wall 35 of the side mounting seat 17. In this case, an inclination angle of the inclined wall 35 (with respect to a line perpendicular to a base of the chute 13) of the side mounting seat 17 is 3°, and thus the width Wnf is about 43.5 mm.

Figure 7:
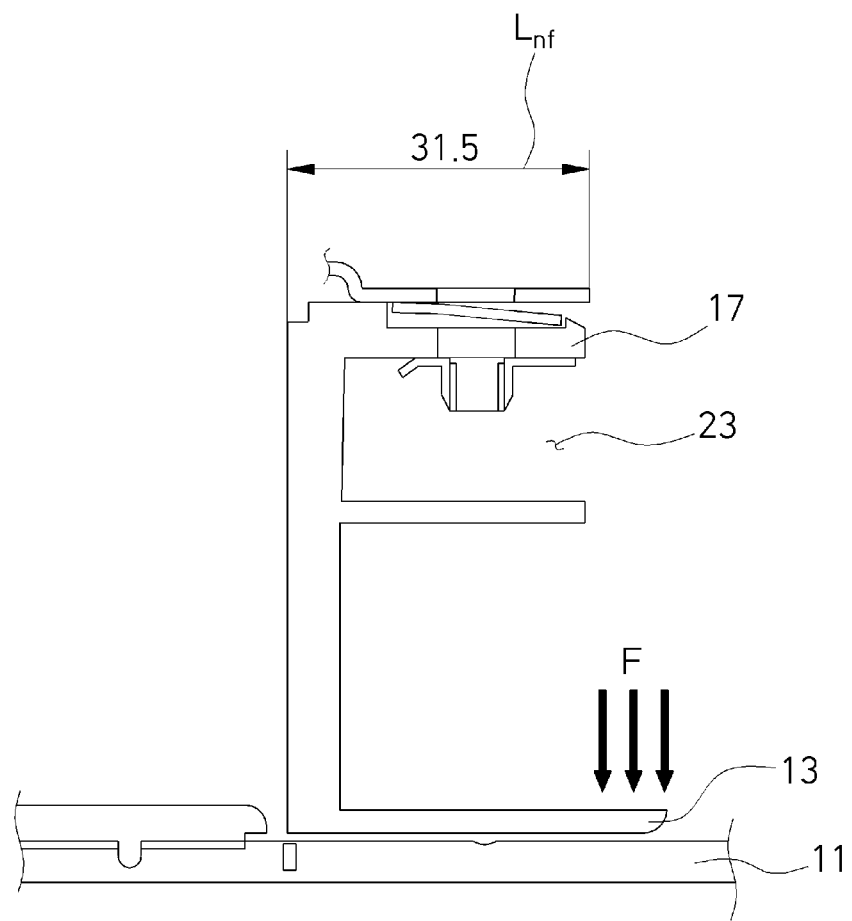
FIG. 7 is a cross-sectional view taken along line B-B of FIG. 5.

FIG. 7 is a cross-sectional view taken along line B-B of FIG. 5. Since the direct pressing force F of the vibration pressing welding jig is directly applied to a front side (a side of the doghouse 23) of the side mounting seat 17, the force F is not applied to a length Lnf of the side mounting seat 17. In this case, the length of the side mounting seat 17, that is, the length Lnf of a region, which is not pressed directly, is about 31.5 mm.

In FIGS. 6 and 7, since the region of the width Wnf (of about 43.5 mm) and the length Lnf (of about 31.5 mm) in the PAB chute 13 is not pressed directly by the vibration pressing welding jig, weldability and welding quality is degraded in the region.

Figure 8:
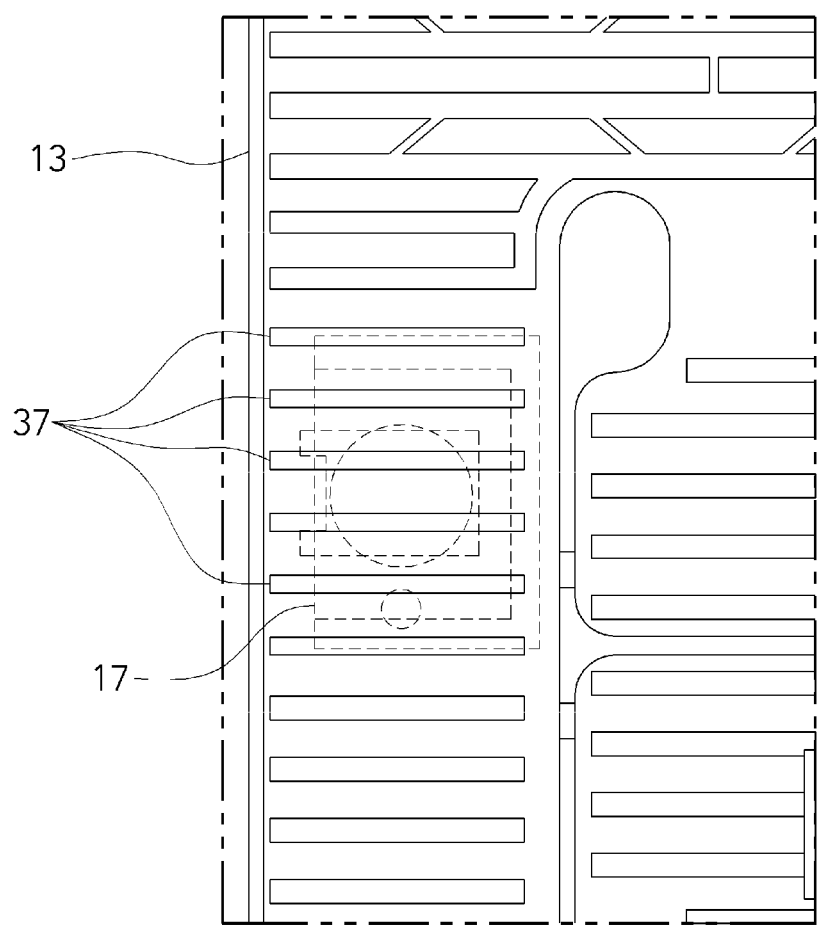
FIG. 8 is a bottom view illustrating the PAB chute (13) illustrated in FIG. 4.

FIG. 8 is a bottom view illustrating the PAB chute 13 illustrated in FIG. 4. Since the vibration pressing welding jig does not directly press welding ribs 37 of a region of the side mounting seat 17 which is expressed blurred, the welding ribs 37 are thinner than those of the other region and are disposed only in the breadthwise direction.

Figure 9:
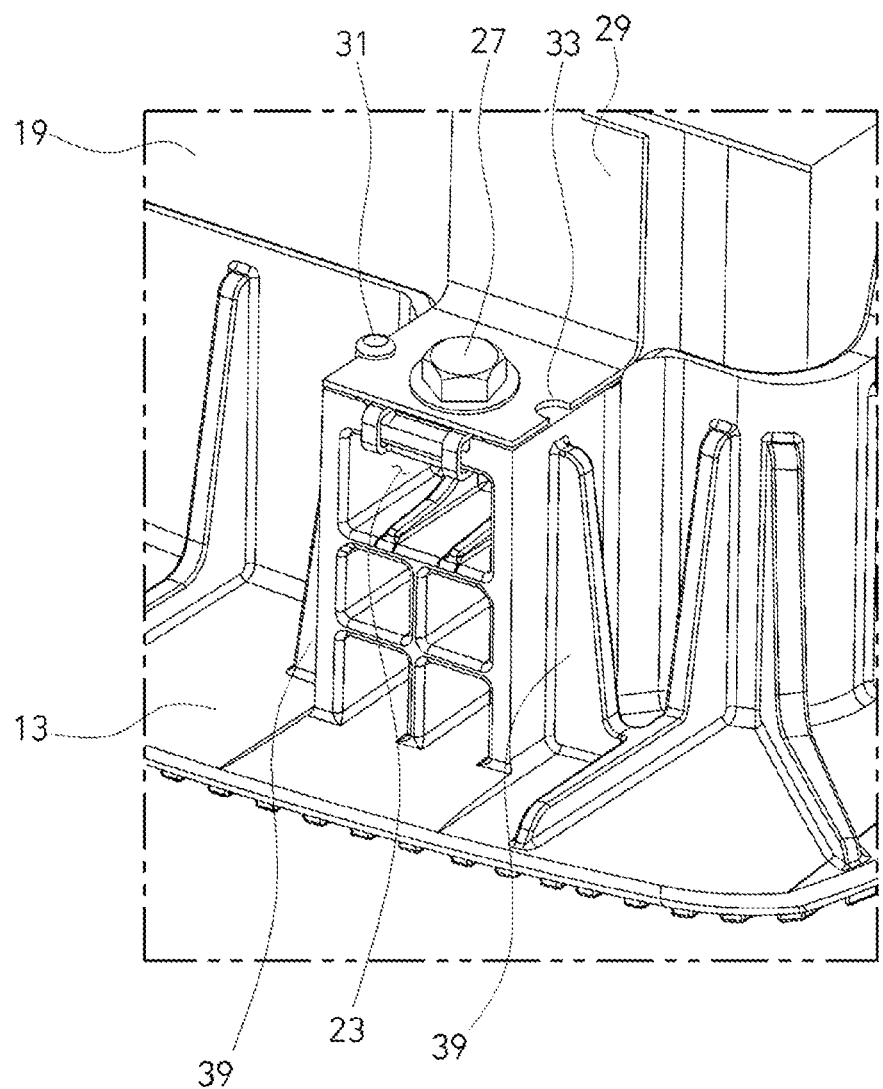
FIG. 9 is a detail view illustrating a coupling portion for a PAB chute (13) and a PAB module (19) according to the present disclosure.
Figure 10:
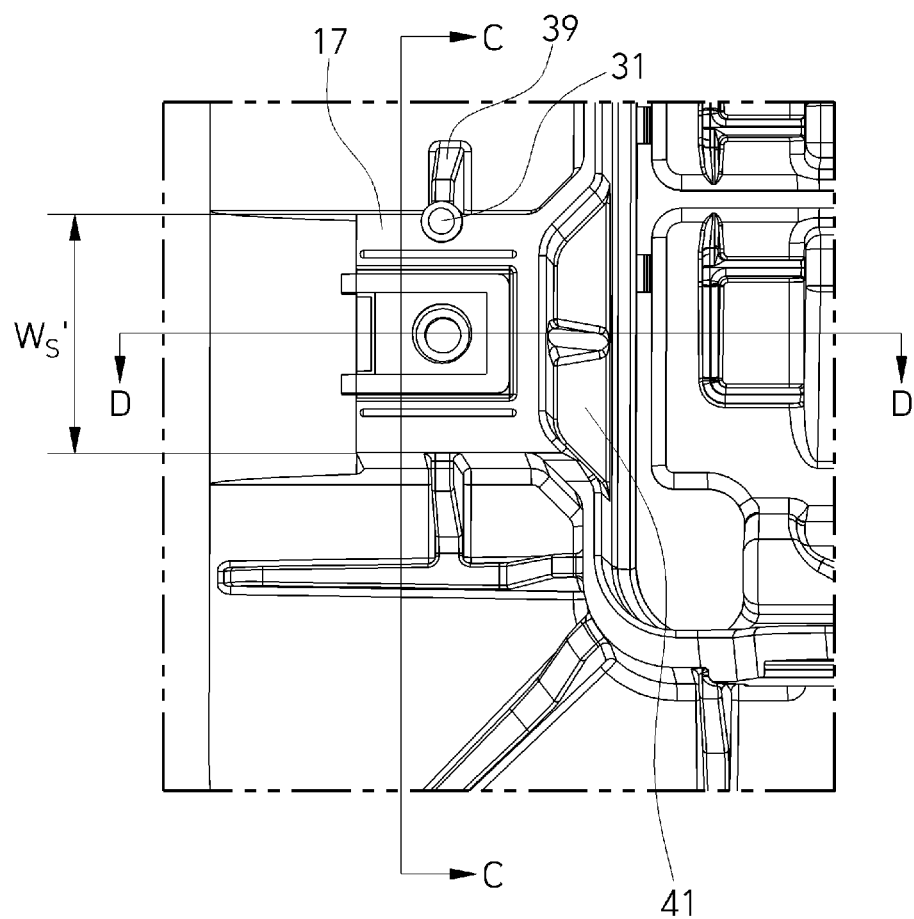
FIG. 10 is a plan view illustrating a side mounting seat (17)

FIG. 9 is a detailed view according to the present disclosure, illustrating a coupling portion of a PAB chute 13 and a PAB module 19 in a state, in which a method of improving vibration weldability is applied thereto; FIG. 10 is a plan view illustrating a side mounting seat 17 from which the PAB module 19 is separated.

100% of a diameter of at least one guide protrusion 31 of the side mounting seat 17 is not formed in the side mounting seat 17 as shown in FIGS. 4 and 5. Instead, a portion excluding the entire diameter of the guide protrusion 31 is located outside the surface of the side mounting seat. Specifically speaking, only about 50 to 70% of the diameter of the guide protrusion 31 is formed in the side mounting seat 17, and a portion of the remaining diameter is formed to be located at a deviated surface of the side mounting seat 17 as a separate column 39 extending from a base surface of the PAB chute 13 to maintain a function of a protrusion guiding a groove 33 of a bracket. Accordingly, as shown in FIG. 10, an entire width Ws' of the side mounting seat 17 of the present disclosure decreases (entire width Ws' is about 32 mm). The fact that the entire width Ws' decreases from 38 mm of FIG. 6 to 32 mm of FIG. 11 means that a region, which is directly pressed by a vibration pressing welding jig, is widened.

Figure 11:
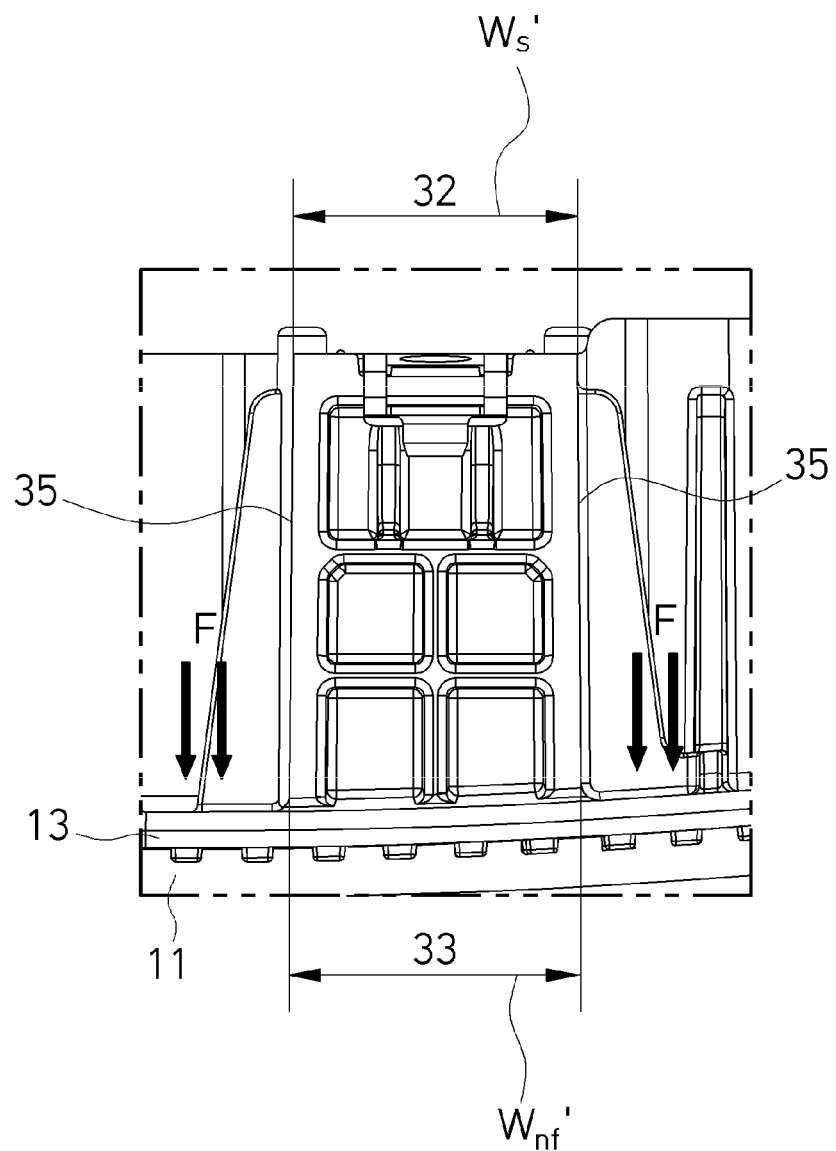
FIG. 11 is a cross-sectional view taken along line C-C of FIG. 10.

FIG. 11 is a cross-sectional view taken along line C-C of FIG. 10. An inclined angle of an inclined wall 35 of the side mounting seat 17 (with respect to a line perpendicular to a base of the chute 13) decreases to 0.5°, and thus a width Wnf', to which a direct pressing force F of the vibration pressing welding jig is not applied, decreases (Wnf' is about 33 mm). Even in this case, the fact that the width Wnf' decreases from 43.5 mm of FIG. 6 to 33 mm of FIG. 11 means that the region directly pressed by the vibration pressing welding jig increased.

Figure 12:
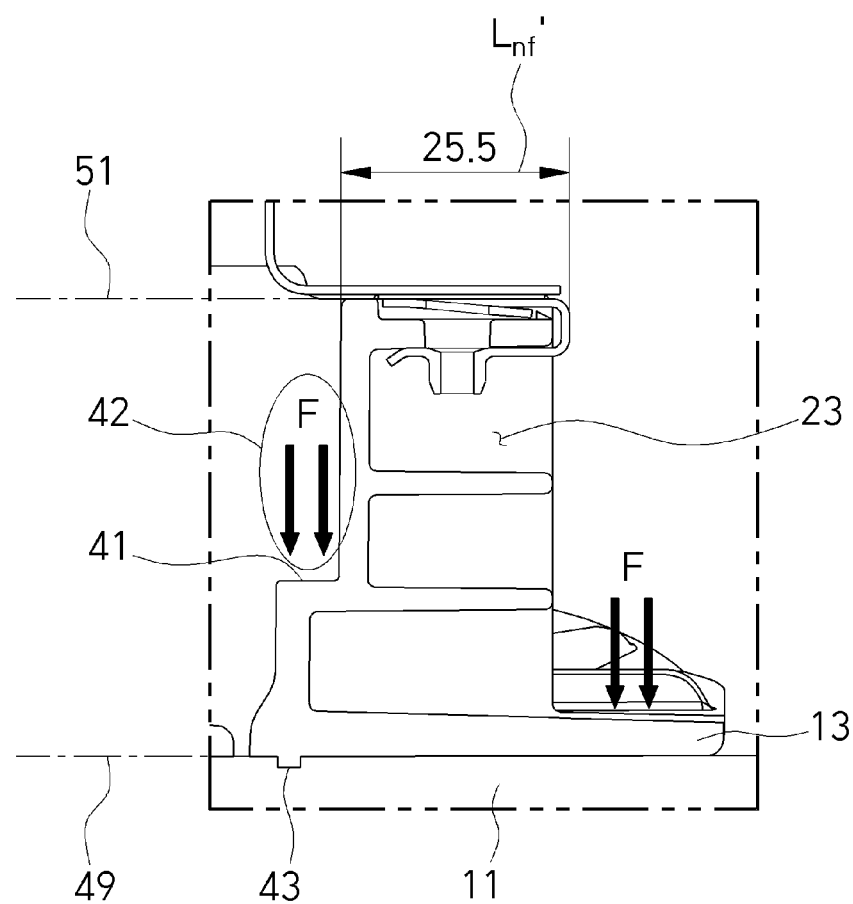
FIG. 12 is a cross-sectional view taken along line D-D of FIG. 10.

FIG. 12 is a cross-sectional view taken along line D-D of FIG. 10. Compared to FIG. 7, it can be seen that the direct pressing force F of the vibration pressing welding jig is applied not only to a front side of the side mounting seat 17 (i.e., to an opening of a doghouse 23) but also to a rear side therefrom; this is possible because a vibration pressing welding jig's direct pressing target surface 41 (also see FIG. 10) is additionally formed behind the side mounting seat 17 (opposite to the opening of the doghouse 23). Accordingly, a region 42 of the direct pressing target surface 41 is directly pressed by the vibration pressing welding jig. The direct pressing target surface 41 is formed between a vibration welded base surface 49 and an upper surface 51 of the side mounting seat 17. It is desirable that the direct pressing target surface 41 is formed with a lower step than the upper surface 51 of the side mounting seat 17 to reduce the pressure loss of the pressing welding jig.

Figure 13:
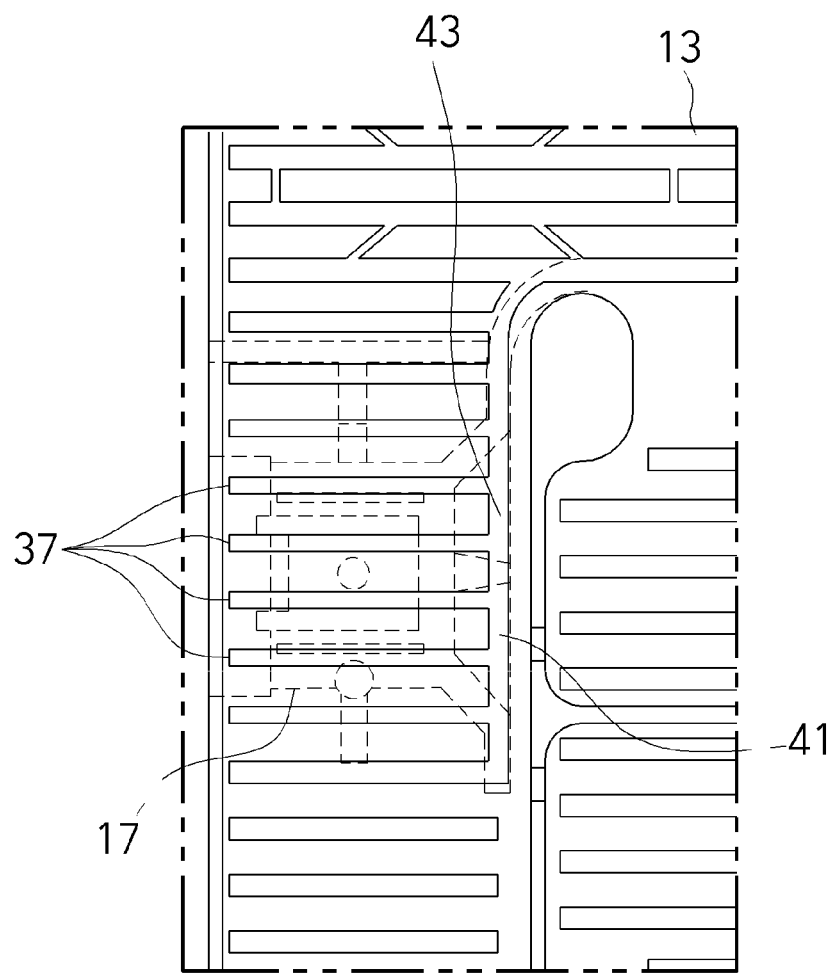
FIG. 13 is a bottom view illustrating the PAB chute (13) illustrated in FIG. 10.

In addition, as the added direct pressing target surface 41 may be directly pressed by the vibration pressing welding jig, a new welding rib 43 is additionally formed on a crash pad panel 11 to weld the PAB chute 13 (See FIG. 13). The added direct pressing target surface 41 and new welding rib 43 are illustrated in a bottom view of FIG. 13. As shown in FIG. 13, it can be seen that, unlike FIG. 8, not only welding ribs 37 are present to be positioned in a breadthwise direction but also a welding rib 43 is present to be positioned in a lengthwise direction at a lower portion at a side opposite to the side mounting seat 17. As the direct pressing target surface 41 of FIG. 12 is added, it is possible to newly install the welding rib 43 in the lengthwise direction, which was not possible to adopt in the conventional case (see FIG. 8), thereby securing an additional welding area to obtain high weldability or adhesive strength.

In addition, a length of the side mounting seat 17, that is, a length Lnf' to which the direct pressing force F is not applied, is decreased to about 25.5 mm. Accordingly, since the length Lnf', which is not directly pressed, decreases to about 25.5 mm from the length Lnf of about 31.5 mm as illustrated in FIG. 7, a length which is directly pressed increases proportionally. Therefore, degradation problem of weldability and welding quality is reduced.

According to the above-describe present disclosure, since, while the width of about 30 mm of the bracket 29 of the PAB module 19 is constantly maintained, the width Wnf' and the length Lnf' of a region which is not directly pressed by the vibration pressing welding jig can be respectively secured as about 33 mm and 25.5 mm (so, area is 33×25.5=841 mm$^2$), an area of the direct pressing target region increases when compared to the region in which the length Wnf is about 43.5 mm and the length Lnf is about 31.5 mm (so, area is 43.5×31.5=1370 mm$^2$) of the conventional case so that stable weldability and welding quality can be obtained.

Figure 14:
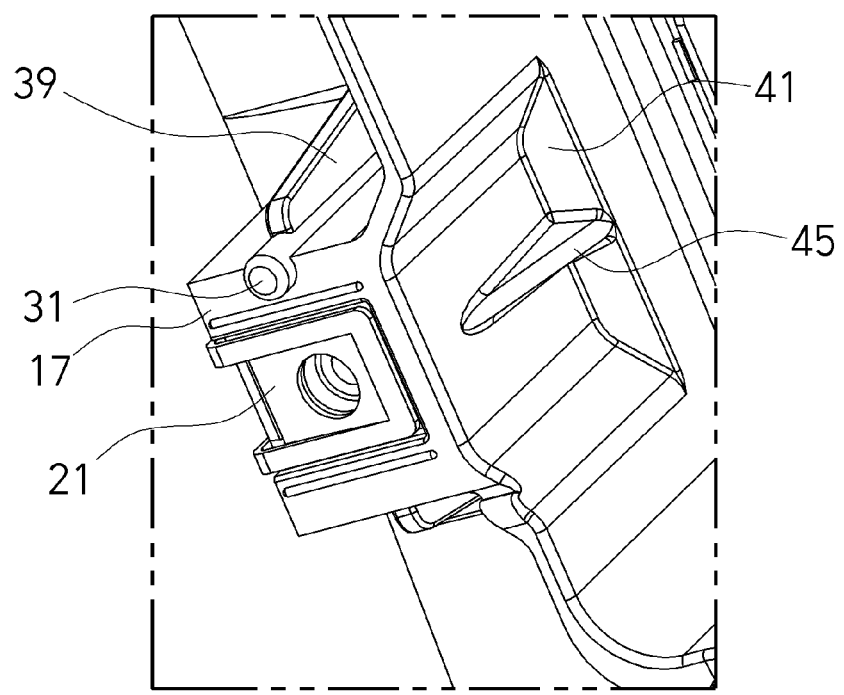
FIGS. 14 and 15 are perspective and cross-sectional views for describing an alternative to prevent hooking when an airbag cushion is inflated.
Figure 15:
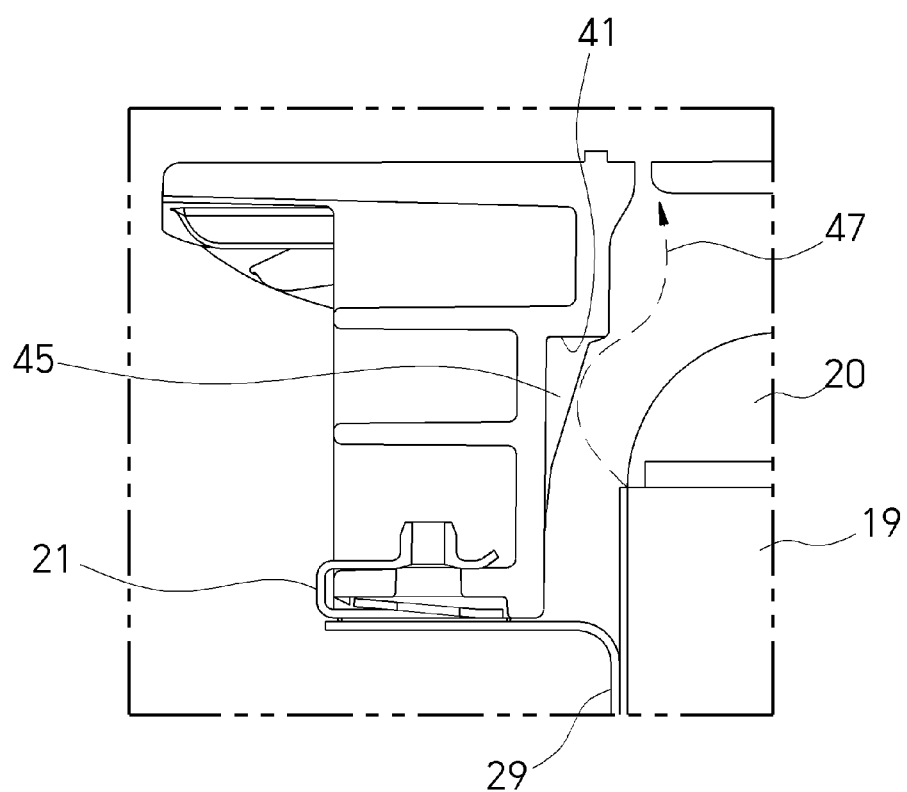

FIGS. 14 and 15 are perspective and cross-sectional views for describing additional securing of a pressing target area of the side mounting seat 17 and an alternative to prevent hooking when an airbag cushion is inflated.

A protect rib 45 having a right triangle shape is formed across the direct pressing target surface 41 formed inward from the side mounting seat 17 (the side opposite to the opening of the doghouse 23) and a wall of the side mounting seat 17. The protect rib 45 reinforces a strength, which may be generated due to a height difference between the direct pressing target surface 41 and the side mounting seat 17 for additionally securing a welding pressing target area, of a sidewall region of the side mounting seat 17 and simultaneously serves an auxiliary function of allowing the airbag cushion to smoothly deploy along the protect rib 45 having a diagonal line without being interfered with the direct pressing target surface 41 when the airbag cushion deploys in the PAB module 19. In FIG. 15, a dotted arrow 47 in which the airbag cushion smoothly slips along a diagonal surface of the protect rib 45 is illustrated.

As described above, in the present disclosure, since a space of a doghouse of a side mounting seat is minimized and an area which can be pressed is increased, a direct pressing force of a welding pressing jig can be increased without destroying the side mounting seat so that weldability and welding quality can be improved. Accordingly, since a quality distribution (deviation) of a welding process, which may be generated in a process of manufacturing a PAB chute directly connected to passenger safety, is reduced, a problem of chip (clam shell) scattering, which can occur while an airbag deploys, can be reduced. In addition, bending of an exterior surface of a crash pad panel occurring in a pressing target area due to pressure unbalance of the welding pressing jig can be minimized.

Although the present disclosure has been described in detail with reference to the exemplary embodiment of the present disclosure, it will be understood by those skilled in the art that the invention may be performed in other concrete forms without changing the technological scope and essential features.

Therefore, the above-described embodiment should be considered as only an example in all aspects and not for purposes of limitation. In addition, the scope of the present disclosure is defined not by the detailed description but by the appended claims and encompasses all modifications or alterations derived from meanings, the scope, and equivalents of the appended claims.

What is claimed is:

1. A side mounting seat, on which a bracket of a passenger airbag (PAB) module including a PAB is mounted, of a PAB chute which is vibration-welded to a crash pad panel by a vibration pressing welding jig, the side mounting seat comprising:
   a doghouse having a hollow space between a lower portion of the side mounting seat and a base surface of the PAB chute and including an opening at one side of the doghouse; and
   a direct pressing target surface extending at a right angle on a closed wall disposed at an opposite side of the opening of the doghouse, and located at a position higher than the base surface of the PAB chute, such that the direct pressing target surface is directly pressed by the vibration pressing welding jig when the PAB chute is vibration-welded to the crash pad panel.

2. The side mounting seat of claim 1, further comprising a first welding rib disposed on the base surface of the PAB chute and vibration-welded to the crash pad panel.

3. The side mounting seat of claim 2, wherein the first welding rib extends at a right angle with respect to the opening of the doghouse.

4. The side mounting seat of claim 3, further comprising a second welding rib disposed on the base surface of the PAB chute and extending in a direction perpendicular to a direction in which the first welding rib extends.

5. The side mounting seat of claim 1, further comprising:
   at least one guide protrusion disposed on an upper surface, on which the bracket is seated, of the side mounting seat, wherein one portion of the guide protrusion is disposed on the upper surface, on which the bracket is seated, of the side mounting seat; and
   a sidewall having an angle of inclination with respect to the base surface of the PAB chute.

6. The side mounting seat of claim 5, wherein a remaining portion of the guide protrusion, excluding the one portion of the guide protrusion disposed on the upper surface of the side mounting seat, is located outside the upper surface of the side mounting seat.

7. The side mounting seat of claim 5, further comprising a column connected to a remaining portion of the guide protrusion, excluding the one portion of the guide protrusion disposed on the upper surface of the side mounting seat, the column extending across the base surface of the PAB chute and the sidewall of the side mounting seat.

8. The side mounting seat of claim 1, wherein the direct pressing target surface is located at a position lower than an upper surface of the side mounting seat.

9. The side mounting seat of claim 1, further comprising a protect rib having a right triangle shape and disposed across the direct pressing target surface and the closed wall of the doghouse.

10. A method of manufacturing a passenger airbag (PAB) chute which includes a side mounting seat on which a bracket of a PAB module including PAB is mounted and is vibration-welded to a crash pad panel by a vibration pressing welding jig, the method comprising:
    forming a doghouse between a lower portion of the side mounting seat and a base surface of the PAB chute, the doghouse including an opening at one side of the doghouse; and
    forming a direct pressing target surface extending at a right angle on a closed wall disposed at an opposite side of the opening of the doghouse, the direct pressing target surface being located at a position higher than the base surface of the PAB chute, such that the direct pressing target surface is directly pressed by the vibration pressing welding jig when the PAB chute is vibration-welded to the crash pad panel.

11. The method of claim 10, further comprising forming a first welding rib on the base surface of the PAB chute, and vibration-welding the first welding rib to the crash pad panel.

12. The method of claim 11, wherein the first welding rib extends at a right angle with respect to the opening of the doghouse.

13. The method of claim 12, further comprising forming a second welding rib on the base surface of the PAB chute, wherein the second welding rib extends in a direction perpendicular to a direction in which the first welding rib extends.

14. The method of claim 10, further comprising:
    forming at least one guide protrusion on an upper surface, on which the bracket is seated, of the side mounting seat, wherein one portion of the guide protrusion is disposed on the upper surface, on which the bracket is seated, of the side mounting seat; and
    forming a sidewall having an angle of inclination with respect to the base surface of the PAB chute.

15. The method of claim 14, wherein a remaining portion of the guide protrusion, excluding the one portion of the guide protrusion disposed on the upper surface of the side mounting seat, is located outside the upper surface of the side mounting seat.

16. The method of claim 14, further comprising forming a column connected to a remaining portion of the guide protrusion, excluding the one portion of the guide protrusion disposed on the upper surface of the side mounting seat, the column extending across the base surface of the PAB chute and the sidewall of the side mounting seat.

17. The method of claim 10, wherein the direct pressing target surface is located at a position lower than an upper surface of the side mounting seat.

18. The method of claim 10, further comprising forming a protect rib having a right triangle shape and disposed across the direct pressing target surface and the closed wall of the doghouse.

* * * * *